United States Patent Office 3,222,184

Patented Dec. 7, 1965

3,222,184

CULINARY MIX UTILIZING LIQUID OIL SHORTENING AND PROCESS FOR PREPARING SAME

Robert M. Weiss, Joseph M. Sinner, and Walter F. Bloch, Minneapolis, Minn., assignors to The Pillsbury Company, Minneapolis, Minn., a corporation of Delaware No Drawing. Filed Mar. 21, 1962, Ser. No. 181,453

9 Claims. (Cl. 99—94)

This invention relates to a packaged prepared cake mix utilizing liquid oil shortening, which packaged cake mix has the necessary shelf life since only a portion of the oil is oriented in the dry ingredients along with an emulsifying agent.

It has long been known that cakes can be prepared from liquid oils to get improved eating qualities, increased moistness, improved crumb structure and texture, and the like. However, in the prepared cake mix art, the use of a relatively high percent of liquid oil shortenings has not proved advantageous because of certain technical problems associated therewith. Most home recipes for cakes have a shortening content in the range of approximately 16 to 22 percent basis dry ingredients. However, most of the commercial premixes which are available on the market seldom have more than 12 to 13 percent shortening basis dry ingredients. When commercial cake premixes are formulated with a shortening content level much above 12 or 13 percent, many technical problems are encountered, such as, the inability of processing and packaging equipment to handle the premix because of a decrease in flowability. In addition, when cake premixes are formulated with a shortening level much above 13 percent, the premix has a great tendency to oil out, i.e., to lose its oil to the container surfaces, particularly in higher storage temperatures.

We have discovered a novel method of preparing and packaging a cake premix for use in preparing a cake wherein the shortening is a liquid oil and in which the shortening content is higher than has heretofore normally been possible in commercial prepared cake mixes.

It is, therefore, an object of our invention to provide a cake premix package for use in preparing a cake in which liquid oil is the primary shortening and in which the shortening level is comparable to the shortening level used in most home recipes.

It is a further object of our invention to provide a method whereby a cake can be prepared from a prepared cake mix package, which cake has liquid oil as the primary shortening in such quantity as to provide a cake with shortening quantities comparable to those used in most home standard cake recipes.

Another object of our invention is to provide a prepared cake mix package which can be used in the preparation of a cake with a shortening level comparable to home cake recipes wherein liquid oil is used as the primary shortening ingredient, which prepared cake mix package will have the necessary shelf life stability for commercial use.

Further objects of our invention will be apparent from the description herein.

Generally speaking, cakes with relatively high shortening content have superior eating qualities. We attempted to produce such a cake mix on a commercial scale, but encountered the aforementioned difficulties. Further, since cakes produced with liquid oil as the primary shortening have certain superior qualities compared with cakes made with hydrogenated shortening, we attempted to produce a cake premix utilizing liquid oil by admixing all the liquid oil directly with the dry portion of the premix. However, as indicated above, when the shortening content exceeded about 13 percent basis of dry ingredients, the product was difficult to handle, it tended to oil out and generally lacked the necessary shelf lastability.

We next attempted to place all of the liquid oil in a separate pouch and enclosed this pouch in a package containing the balance of the premix ingredients. This procedure was not satisfactory because of certain difficulties with the emulsifier which was added directly to the dry portion of the premix. By so being admixed with the dry ingredients without part of the shortening, the emulsifier apparently did not function properly as an emulsifier, since failures were quite numerous.

We then attempted to include the emulsifier with the liquid shortening in the pouch, but the emulsifier tended to separate out of the oil. When the contents of the pouch were emptied, quite often a high portion of the emulsifier remained in the opened pouch and was discarded therewith, again resulting in numerous unsatisfactory cakes. Accordingly, we found it generally unsatisfactory to attempt to put the emulsifier in the liquid oil pouch.

We then made the novel discovery that if we mixed only a portion of the liquid oil with the emulsifying agent and then blended this oil-emulsifier concentrate admixture with the dry portion of the premix and then placed the balance of the liquid oil in a separate pouch, we then had a cake premix package which had the necessary shelf life stability. By orienting the emulsifier in only a portion of the liquid oil and adding this admixture to the dry premix, we found that the emulsifier would then perform in a satisfactory manner to produce acceptable cakes. We found that it was essential that a portion of the liquid oil must be added with the emulsifier to form an admixture, which admixture is added to the dry mix portion when forming the cake premix package. Thus we were able to prepare a cake premix package which could be used to make a cake in which the shortening was primarily liquid oil and at the same time have a package which had the necessary shelf life stability.

In some instances, we have used hydrogenated shortening to admix in the emulsifier-oil concentrate, then blended this admixture with the dry portions. We then included an oil pouch containing liquid oil as the balance of the shortening, from which the cake could be made. However, it is our preferred form to use liquid oil for the purpose of orienting the emulsifier in the dry portion, as well as liquid oil in the pouch, thus obtaining a cake with 100 percent liquid oil as the shortening. Liquid oils which we have found satisfactory are the usual vegetable oils including corn oil, cotton seed oil, peanut oil and the like.

Even with hydrogenated shortening, when the shortening content exceeded about 13 percent of the nonaqueous dry ingredients, similar problems were encountered. However, we found that it was not satisfactory to use hydrogenated shortening in a separate pouch or container because of the difficulty encountered by the housewife in removing these hydrogenated shortenings from the containers in which they were pouched. In addition, there is the problem of incorporating large quantities of hydrogenated shortenings into the balance of the ingredients because of the formation of pills and uneven mixing. Thus we did not find it satisfactory to use hydrogenated shortening rather than liquid oils in the separate container.

The separate oil container can be of any suitable material which will satisfactorily contain the liquid oil and include cans, glass containers and the like. However, we prefer to use a plastic, oil-impervious pouch or a plastic tube with a twist-off end because of certain conveniences associated therewith. The preferred form is to include the oil pouch within the carton containing the dry ingredients but in some situations the oil container may be attached outside the container containing the dry ingredients. In other situations, it may be desirable to have the housewife or ultimate user add the balance of the oil as is done with the eggs and water. When this is done, no separate oil pouch need be included with the cake premix container. When this procedure is followed, the ultimate user can prepare successful cakes utilizing our premix because the emulsifier is already oriented in that premix along with a portion of the shortening. Thus the ultimate user does not have the problem of uniformly distributing the emulsifier into the ingredients since our premix already has the emulsifier uniformly distributed in the dry mix portion. The remaining ingredients which we use for making the cake premix are standard cake mix ingredients and include flour, sugar, non-fat dry milk solids, salt, leavening and flavoring.

By referring to the examples which are hereinafter recited, specific embodiments of our invention are taught.

*Example I*

A white liquid oil cake was made utilizing a prepared cake mix package containing the following ingredients numbered 1 through 13.

| | Ingredient | Ounces or Parts by Weight | Grams |
|---|---|---|---|
| 1 | Sugar | 8.03 | 227.64 |
| 2 | Flour | 7.32 | 207.13 |
| 3 | Non-Fat Dry Milk Solids | .40 | 11.37 |
| 4 | Salt | .20 | 5.68 |
| 5 | Soda | .13 | 3.82 |
| 6 | Sodium Acid Phosphate | .14 | 3.97 |
| 7 | Anhydrous Monocalcium Phosphate | .02 | .55 |
| 8 | Dried Egg White | .15 | 4.27 |
| 9 | Dried Lecithin | .12 | 3.42 |
| 10 | Carboxymethyl Cellulose | .04 | 1.16 |
| 11 | Vanilla | .06 | 1.70 |
| 12 | Oil-Emulsifier Concentrate | 1.14 | 32.29 |
| 13 | Corn Oil (pouch) | 2.25 | 64.00 |
| 14 | Three Egg Whites | 3.17 | 90.00 |
| 15 | One Cup Water | 8.32 | 236.00 |
| Total | | 31.49 | 893.00 |

In preparing the premix package, we first prepared the oil-emulsifier concentrate listed after Item No. 12 above by blending 45 percent of the monoglyceride glycerol lactopalmitate and 55 percent of liquid corn oil. This oil-emulsifier concentrate was then admixed with the balance of the ingredients numbered 1 through 11 in the above example to produce a dry premix. This dry premix was then placed in a paperboard carton of standard design for cake premixes together with a plastic pouch containing the corn oil listed as Item No. 13 above. The carton was then closed to form a prepared premix package for the production of a liquid oil cake.

The foregoing package was placed in storage for approximately six months, which is considered to be an average storage period for standard cake premixes. Following this storage period, the dry premix was removed from the package and blended with the oil contained in the pouch together with three egg whites shown as Item No. 14 above and one cup of water shown as Item No. 15 above. All of the ingredients were first blended for one minute on a Hamilton Beach mixer at Speed 1 (350 r.p.m.) and then beaten for four minutes at Speed 5 (550 r.p.m.). The resulting batter was then baked in two 8-inch cake pans at 350° F. for about 30–35 minutes. A very satisfactory cake was produced which demonstrated all of the desirable characteristics of a cake made with liquid shortening including improved crumb structure, increased moistness and improved taste. It will be observed that in the foregoing example the total of the emulsifier concentrate plus the oil in the pouch totaled 3.39 ounces or parts which was the equivalent of about 17 percent of the total dry ingredients.

*Example II*

A chocolate liquid oil cake was also prepared utilizing the same technique as stated in Example I with the following ingredients:

| | Ingredient | Ounces or Parts by Weight | Grams |
|---|---|---|---|
| 1 | Sugar | 8.44 | 239.03 |
| 2 | Flour | 6.21 | 176.05 |
| 3 | Cocoa | 1.00 | 28.37 |
| 4 | Non-Fat Dry Milk Solids | .40 | 11.37 |
| 5 | Salt | .20 | 5.68 |
| 6 | Soda | .18 | 5.13 |
| 7 | Sodium Acid Phosphate | .06 | 1.71 |
| 8 | Anhydrous Monocalcium Phosphate | .06 | 1.71 |
| 9 | Carboxymethyl Cellulose | .23 | 1.16 |
| 10 | Vanilla | .02 | .50 |
| 11 | Oil-Emulsifier Concentrate | 1.14 | 32.29 |
| 12 | Corn Oil (pouch) | 2.25 | 64.00 |
| 13 | Three Eggs | 5.29 | 150.00 |
| 14 | One Cup Water | 8.32 | 236.00 |
| Total | | 33.80 | 953.00 |

In this example, the emulsifier-oil concentrate was composed of 50 percent monoglycerides and 50 percent corn oil. The oil-emulsifier concentrate was blended as in Example I and admixed with the rest of the dry ingredients listed as 1 through 11 above. This dry mix was then placed in a cake package together with a plastic pouch of oil shown as Item 12 above. Following a standard shelf life period, the dry mix and the oil in the pouch were admixed together with three eggs and one cup of water shown as Items 13 and 14 above. The ingredients were blended for one minute and then beaten four minutes and baked as in Example I. A very satisfactory chocolate cake was produced.

*Example III*

We next prepared a yellow liquid oil shortening cake utilizing a prepared cake mix package with the ingredients 1 through 12 included in the premix package.

| | Ingredient | Ounces or Parts by Weight | Grams |
|---|---|---|---|
| 1 | Sugar | 8.34 | 236.45 |
| 2 | Flour | 7.06 | 199.93 |
| 3 | Non-Fat Dry Milk Solids | .40 | 11.37 |
| 4 | Salt | .20 | 5.68 |
| 5 | Soda | .14 | 3.97 |
| 6 | Sodium Acid Phosphate | .14 | 3.97 |
| 7 | Anhydrous Monocalcium Phosphate | .07 | 1.96 |
| 8 | Carboxymethyl Cellulose | .04 | 1.16 |
| 9 | Yellow Color | .12 | 3.42 |
| 10 | Vanilla | .10 | 2.80 |
| 11 | Oil Emulsifier Concentrate | 1.14 | 32.29 |
| 12 | Corn Oil (pouch) | 2.25 | 64.00 |
| 13 | Three Eggs | 5.29 | 150.00 |
| 14 | One Cup Water | 8.32 | 236.00 |
| Total | | 33.61 | 953.00 |

The cake premix package was first prepared including the items listed as 1 through 11 in the dry portion and an oil pouch shown as Item 12, following the procedure outlined for Example II. A batter was then prepared in which eggs and water shown as Items No. 13 and 14 above were added. The admixture was blended for one minute and beaten for four minutes and then baked as in Examples I and II. A successful yellow liquid oil cake was produced.

We have produced operable cakes utilizing our invention in which the ingredients had the following parts by weight range: Sugar in the range of from about 6–9 parts; flour 5–8 parts; non-fat dry milk solids of about ½ part and an oil-emulsifier concentrate of about 1 part. In addition to the above parts, the batter used in preparing the cake also contained about 1½–4 parts of liquid oil; about 3–6 parts of eggs and 7–9 parts of water. Thus it will be seen that all of our inedients are standard prepared cake mix ingredients except that we utilize a liquid oil as a shortening and the shortening level is at a higher level than as heretofore been possible in prepared commercial cake mixes. By our invention we have been able to prepare packaged cake mixes which will produce cakes with a shortening content comparable to that obtained by most home recipes. In other words, we have been able to formulate a premix wherein we are not limited in the total shortening content which may be used and have therefore been able to approximate home cake recipes wherein the shortening has ranged from about 16 to 22 percent basis the non-aqueous dry ingredients.

The type of leavening agent we use is not critical and we have used the following: cream of tartar, sodium acid pyrophosphate, anhydrous monocalcium phosphate, monocalcium phosphate monohydrate, glucono delta lactone, sodium aluminum phosphate, soda—granular, citric acid, and dicalcium phosphate dihydrate. In short, the leavening requirements of a liquid shortening formulation do not differ from normal mix formulations and the choice of the particular acids to be used depends on the particular flavor of the mix in question, desired end results and results and economics, all well within the knowledge of one skilled in the art after being presented with our invention.

As to the emulsifier included in the oil-emulsifier concentrate, several emulsifiers are satisfactory including lard monoglycerides and vegetable base monoglycerides.

An essential feature of our process and product is the discovery that the emulsifier used in the cake must be oriented in a portion of the liquid oil by forming an admixture of the emulsifier with a portion of the oil, and adding this admixture to the dry ingredients of the prepared cake premix. Only by so orienting the emulsifier and so addding it to the dry ingredients did we achieve successful production of oil cakes with a shortening content comparable to home recipe cakes and at the same time achieved the necessary shelf life.

With respect to the oil-emulsifier concentrate we have found that the preferred ratio between the oil and emulsifier in the concentrate is in the range of 1 part oil to 1 part emulsifier. However, we have used formulations of 1 part oil to 3 parts emulsifier to produce generally satisfactory cakes. When the oil level relative to the emulsifier was reduced below this level, we obtained poor performance. When more than 50 percent of the total amount of liquid oil that is used to provide the shortening for the cake was added to the oil-emulsifier concentrate, and this admixture was added to the dry portion prior to packaging, we began to encounter the problems associated with a prepared cake premix containing all the liquid oil admixed directly therein. In other words, we began losing the advantage of separately pouching the oil. Thus we found that we could not go much above a ratio of 3 parts of oil to 1 part emulsifier. In the preferred form of the invention, we incorporate not more than about 25 percent and not less than about 10 percent of the total liquid oil cake shortening into the dry ingredients along with the emulsifier in the oil-emulsifier concentrate.

It can be seen that we have provided the prepared cake mix art with a method and product for preparing a liquid oil shortening cake with a shortening content comparable to that of most home recipes by utilizing a prepared cake mix package. Our prepared cake mix package has the necessary shelf life stability for commercial use which has heretofore not been possible when relatively large quantities of shortening were incorporated into the premix by the manufacturers.

The above-listed examples are merely exemplary in form and are merely illustrative of our invention. It is to be understood that various modifications in formulation of shortening cake premixes may be made without departing from the spirit and scope of the invention which is described by the claims.

What we claim is:

1. A prepared packaged cake mix for producing a cake having at least 13% shortening basis dry ingredients comprising: a first container in which is included a dry composition comprised of sugar, flour, leavening and an oil-emulsifier admixture which admixture is comprised of liquid oil and emulsifier in the range of from 1 part liquid oil and 3 parts emulsifier to 3 parts liquid oil and 1 part emulsifier; and a second container containing an edible liquid oil in such amount as to provide the balance of the shortening necessary for the cake.

2. A prepared packaged cake mix for producing a cake having at least 13% shortening basis dry ingredients comprising: a first container containing a dry cake premix comprised of sugar, flour, leavening, 1 to 3 parts emulsifier, and 1 to 3 parts of a quantity of liquid shortening in the range of 10–50 percent of the total shortening used in the cake; and a second container containing an edible liquid oil in such amount as to provide the balance of the shortening necessary for the cake.

3. A prepared packaged cake mix for producing a cake having at least 13% shortening basis dry ingredients comprising: an outer container containing a dry cake premix comprised of sugar, flour, leavening, 1 to 3 parts emulsifier, and 1 to 3 parts of a quantity of liquid oil shortening representing about 20 percent of the total shortening used in the cake; and a second container containing the balance of the liquid oil shortening used in the cake with said second container enclosed within said outer container.

4. A prepared packaged cake mix for producing a cake having at least 13% shortening basis dry ingredients comprising: an outer container containing a dry cake premix comprised of sugar, flour, leavening, 1 to 3 parts emulsifier and 1 to 3 parts of a quantity of liquid oil shortening in the amount of 10–25 percent of the total liquid oil used in the cake, which said total liquid oil equals at least 14 percent of the nonaqueous portion of the cake batter; and a second container containing liquid oil shortening in an amount necessary to provide the balance of the shortening for the cake.

5. A prepared package cake mix for producing a cake having at least 13% shortening basis dry ingredients comprising: an outer container containing a dry cake premix comprised of sugar, flour, leavening and an oil-emulsifier concentrate comprised of liquid oil shortening and emulsifier in the ratio of about one part by weight oil to about one part by weight emulsifier; and a second container containing a quantity of liquid oil in an amount representing the balance of the oil necessary to provide the total shortening for the cake in which the total shortening represents at least 14 percent of the nonaqueous ingredients of the batter used in making the cake.

6. A prepared package cake mix for producing a cake having at least 13% shortening basis dry ingredients comprising: a container containing a dry admixture comprised of sugar, flour, leavening and an oil-emulsifier concentrate, in which said oil-emulsifier concentrate the ratio of liquid oil and emulsifier is about one part by weight liquid oil to about one part by weight emulsifier, and in which the total quantity of liquid oil in said oil-emulsifier concentrate does not exceed about 25 percent of the total shortening necessary to shorten the cake.

7. A prepared cake mix for producing a cake having at least 13% shortening basis dry ingredients comprising: a container containing a dry admixture comprised of the following parts by weight: 6 to 9 parts sugar, 5 to 8 parts flour, about ½ part non-fat dry milk solids, and about 1 part of an oil-emulsifier concentrate, which oil-emulsifier concentrate is comprised of about equal parts of a liquid oil and an emulsifier.

8. A method of producing a prepared packaged cake premix for use in preparing a cake containing liquid oil shortening and having at least 13% shortening basis dry ingredients comprising the steps of: preparing an oil-emulsifier concentrate by blending predetermined quantities of liquid shortening and emulsifier in the range of from about one part by weight of shortening and about three parts by weight of emulsifier to about three parts by weight shortening and about one part by weight emulsifier; admixing said oil-emulsifier concentrate with a composition comprised of sugar, flour and leavening; placing said admixture in an outer container together with a second container containing liquid oil shortening in an amount to provide the balance of the shortening necessary to produce a cake; and closing said outer container.

9. A method of preparing a packaged cake mix for use in producing a cake with liquid oil shortening and having at least 13% shortening basis dry ingredients comprising the steps of: preparing a composition comprised of sugar, flour, leavening, 1 to 3 parts emulsifier and 1 to 3 parts of a quantity of liquid shortening in the range of 10–50 percent of the total shortening used in the cake, as the principal ingredients by thoroughly admixing said ingredients; placing said composition in an outer container together with a second container containing liquid oil shortenng in an amount to provide the balance of the shortening needed to produce a cake; and closing said outer container.

References Cited by the Examiner

UNITED STATES PATENTS

| | | | |
|---|---|---|---|
| 1,170,474 | 2/1916 | Beatty. | |
| 2,815,285 | 12/1957 | Holman et al. | 99—118 |
| 2,815,286 | 12/1957 | Andre et al. | 99—118 |
| 2,864,705 | 12/1958 | Schulman et al. | 99—118 |
| 2,916,379 | 12/1959 | Finucane | 99—94 X |
| 2,918,377 | 12/1959 | Hurley et al. | 99—172 X |
| 2,939,792 | 6/1960 | Kline et al. | 99—94 |
| 3,011,896 | 12/1961 | Eber | 99—118 |
| 3,015,429 | 1/1962 | Morici. | |
| 3,078,168 | 2/1963 | Bedenk | 99—94 |
| 3,096,179 | 7/1963 | Finucane et al. | 99—94 |
| 3,170,796 | 2/1965 | Andre et al. | 99—94 |

OTHER REFERENCES

The Journal of the American Oil Chemists' Society, January 1958, page 28, 99–118.

A. LOUIS MONACELL, *Primary Examiner*.

ABRAHAM H. WINKELSTEIN, RAYMOND N. JONES, *Examiners*.